UNITED STATES PATENT OFFICE.

CARL HOEPFNER, OF FRANKFORT-ON-THE-MAIN, GERMANY.

PROCESS OF EXTRACTING LEAD, ZINC, OR SILVER FROM COMPLEX SULFIDIC ORES.

SPECIFICATION forming part of Letters Patent No. 629,856, dated August 1, 1899.

Application filed November 18, 1897. Serial No. 658,998. (No specimens.)

*To all whom it may concern:*

Be it known that I, CARL HOEPFNER, residing at Frankfort-on-the-Main, in the German Empire, have invented certain new and useful Improvements in Processes of Extracting Lead, Zinc, or Silver from Complex Sulfidic Ores, (for which Letters Patent have been obtained in England, dated April 26, 1895, No. 8,328;) and I do hereby declare the following to be a full, clear, and exact description of the invention, such as will enable others skilled in the art to which it appertains to make and use the same.

This invention has for its object a process of extracting lead, silver, zinc, and gold, if the latter is present, from complex ores, and particularly from complex refractory ores or materials containing these metals in the form of sulfids. As is well known, these complex refractory sulfidic ores found abundantly in Colorado, for instance, and containing considerable quantities of lead, as well as sufficient zinc to warrant its extraction at a profit, have hitherto proven almost worthless because in the extraction of the lead by the ordinary smelting process the whole of the zinc in the ore is lost, together with a marked proportion of lead which goes over into the tough viscous slag, and, on the other hand, because of the lead present the zinc cannot be extracted by the usual process of roasting and distillation on account of the too-rapid melting and scorifying of the ore, rendering its thorough permeation by the air or gas, if not impossible, at least very difficult. These disadvantages are obviated altogether by the process which forms the subject-matter of this invention in that the whole or substantially the whole of the lead, together with the silver, is first extracted by a wet process, leaving the zinc and most of the gold, if such be present, behind in the residues, from which these metals can be readily and economically recovered, as will now be fully described.

In carrying out my invention the sulfidic ores or materials are pulverized and then leached while being stirred with a warm chloridizing solution—as, for instance, a solution of free chlorin or preferably of perchlorid of iron—and still more satisfactorily and economically with a solution of cupric chlorid ($CuCl_2$) of moderate concentration, as a solution containing a quantity of cupric chlorid equivalent to from about three per cent. to four per cent. of metallic copper. When a cupric-chlorid solution is employed, it should contain a solvent of cuprous chlorid, as sodium or calcium chlorid, to keep the cuprous chlorid formed by the reaction in the solution. By these means and at an elevated temperature the whole or substantially the whole of the lead and most of the silver contained in the ore is dissolved and leached out, the reactions taking place in accordance with the following equations:

$$Cl_2 + PbS = PbCl_2 + S.$$

$$2CuCl_2 + PbS = PbCl_2 + Cu_2Cl_2 + S.$$

$$Fe_2Cl_6 + PbS = PbCl_2 + 2FeCl_2 + S.$$

so that a comparatively small quantity of cupric chlorid can be used for the extraction of large quantities of lead, because the cuprous chlorid into which the cupric chlorid is converted by the reaction can be readily and economically regenerated, as hereinafter described. Inasmuch as the temperature of the chloridizing solution is a moderate one—say from about 60° to 80° centigrade—but very little zinc sulfid will be dissolved, so that the bulk of this metal is left behind in the residues and can readily be extracted by the usual smelting process or as hereinafter set forth. After the lead has been extracted from the cuprous-chlorid solution or leaching liquor by refrigeration or by means of a suitable precipitant the silver is extracted by electrolysis or by means of suitable precipitants, as finely-divided copper or lead, or by means of iodides. The residuary mineral containing nearly the whole of the zinc and gold, if the latter be present, may now be treated in various ways for the extraction of the zinc—as, for instance, by chloridizing roasting the said residues—for which purpose sodium, magnesium, or potassium chlorid can be used, whereby the zinc sulfid is converted into chlorid, the reaction taking place in accordance with the following equation:

$$ZnS + 2NaCl + 4O = Na_2SO_4 + ZnCl_2.$$

The resulting zinc chlorid and the sulfate—in this case sulfate of soda—are then dissolved out, and to prepare the solution for electrolysis I prefer to eliminate therefrom as much of the sulfate as possible, preferably by refrigeration or cooling, because in electrolyzing a zinc-chlorid solution containing much of the sulfate oxygen is liberated at the carbon anodes, which are rapidly destroyed thereby, and also because the presence of the sulfate reduces the conductivity of the solution. In this manner I obtain a substantially pure zinc-chlorid solution from which the metal can be extracted electrolytically under simultaneous production of chlorin, which latter can be used in the process either as a chloridizing agent for converting the cuprous chlorid ($Cu_2Cl_2$) into cupric chlorid ($CuCl_2$) or for the extraction of gold, if any be present in the chloridizing roasted ore after the zinc has been eliminated, or such chlorin may be otherwise profitably disposed of. On the other hand, instead of chloridizing roasting the residuary mineral after the extraction of the lead, such mineral can be subjected to the well-known oxidizing roasting to convert the zinc into an oxid, which may then be converted into chlorid in any well-known or desired manner.

The solution of zinc chlorid prepared as above set forth for the extraction of the zinc by electrolysis under simultaneous production of chlorin should contain quite a large proportion of sodium, potassium, or calcium chlorid to increase the conductivity of the electrolyte, while the substantially exhausted electrolyte can be used for leaching fresh batches of ore. In the preliminary leaching of the ore for the extraction of the lead small quantities of zinc are of course dissolved, so that after repeated leachings the solution of cuprous chlorid becomes richer and richer in zinc, which can then be recovered by first eliminating the chlorid of lead by refrigeration and the copper by means of a suitable precipitant—as, for instance, zinc-dust—and then extracting the zinc electrolytically. The lead chlorid obtained by refrigerating its warm solution may be directly decomposed by electrolysis in the molten state or by means of the metallic zinc obtained in the process or by means of zinc-dust or impure old zinc, whereby metallic lead and zinc chlorid are obtained, or the lead chlorid may be converted into other lead combinations, as white lead, peroxid of lead, or chromate of lead, in a well-known manner by means of suitable reagents, as oxids, carbonates, chromates, or sulfates, or the lead chlorid may be otherwise utilized.

I have hereinabove stated that the chloridizing leaching may be effected by various chloridizing agents, as the free chlorin obtained in the electrolytic extraction of the zinc, or by ferric chlorid, whereby ferrous chlorid is formed, which may readily be reconverted into ferric chlorid by means of chlorin or an oxidizing agent, as nitric acid. I prefer, however, to use a cupric-chlorid solution as being the more economical, as well as a good solvent of silver, and because the cuprous chlorid formed can more readily be regenerated, so that, as has been stated, large quantities of lead can be extracted with a comparatively small quantity of cupric chlorid. The regeneration of the cuprous chlorid can indeed be effected not only by means of the free chlorin obtained in the electrolytic extraction of the zinc from its chlorid or by direct electrolysis, as described in my United States Patent No. 507,130, but even more economically by subjecting it to the action of an oxidizing agent or to the action of oxygen or air in the presence of a suitable acid, as hydrochloric acid or chemicals capable of forming hydrochloric acid, as sodium, potassium, or calcium chlorid in presence of sulfuric or sulfurous acid, the reaction taking place in accordance with the following equations:

$$Cu_2Cl_2 + Cl_2 = 2CuCl_2.$$

$$Cu_2Cl_2 + O + 2HCl = 2CuCl_2 + H_2O.$$

$$Cu_2Cl_2 + O + 2NaCl + H_2SO_4 = \\ 2CuCl_2 + H_2O + Na_2SO_4.$$

$$Cu_2Cl_2 + 2O + 2NaCl + SO_2 + H_2O = \\ 2CuCl_2 + H_2O + Na_2SO_4.$$

In order to economize cupric chlorid, I prefer to first react upon the pulverized sulfidic mineral with an acid, as sulfurous, sulfuric, or hydrochloric acid, in order to dissolve out the more readily soluble constituents, as carbonates, if such be present, before leaching out the lead and silver, although the presence of these more soluble constituents does not interfere with or prejudicially affect the extraction of the lead and silver if the action of their sulfids upon the cupric chlorid is sufficiently rapid—that is to say, if the mineral is well stirred during the process of leaching, so as to produce rapid reaction throughout the mass.

Having thus described my invention, what I claim as new therein, and desire to secure by Letters Patent, is—

1. In the extraction of metals from complex sulfid ores and compounds containing lead and zinc, the process which consists in converting the lead, and silver if present, into chlorid by treating the material with a sufficient quantity of a warm solution capable of giving off chlorin and of dissolving the chlorids formed, leaving the greater part of the zinc sulfid undissolved, extracting the chlorid of lead and silver from the solution, and subsequently recovering the remaining zinc, substantially as set forth.

2. In the extraction of metals from complex sulfid ores and materials containing lead and zinc, the process which consists in converting the sulfid of lead, and of silver when present, into chlorid, by dissolving and leaching out the same by treating the material with a warm aqueous solution of cupric chlorid sufficient to dissolve the lead and silver, leaving a greater part of the zinc undissolved, said solution containing a solvent of cuprous chlorid, and separating the metals from the solution by cooling, and subsequently recovering the zinc, substantially as set forth.

3. In the extraction of metals from complex ores, containing lead, silver and zinc, the process which consists in first dissolving out the more soluble carbonates, by reacting upon the material with a mineral acid, then converting the lead and silver sulfids into chlorids by treating the material with a chloridizing solution capable of leaching out the same so as to leave substantially the greater part of the zinc undissolved, and separating said chlorid or chlorids thus dissolved from the solution.

4. The process which consists in treating an ore or material containing lead and zinc in the form of sulfids with a warm chloridizing solution of such composition as to convert the lead sulfid into chlorid, to dissolve and leach out the same and to leave the greater part of the zinc undissolved, reconverting the leaching solution into the chloridizing solution and using such solution repeatedly in the treatment of fresh batches of material after precipitation of the greater part of its lead constituents, whereby said solution becomes gradually enriched with zinc chlorid, purifying the enriched zinc-chlorid solution and extracting the zinc, substantially as described.

5. The process, which consists in treating complex sulfid ores or materials containing lead and zinc with a warm cupric-clorid solution containing a solvent of cuprous chlorid and of such composition as to leave the greater part of the zinc undissolved, thereby converting the lead sulfid into a chlorid, recovering the lead chlorid by refrigeration, reconverting the cuprous into cupric chlorid by an oxidizing agent and returning the cupric-chlorid solution into the cycle of operations, substantially as set forth.

6. The process, which consists in treating complex sulfid ores or materials containing lead and zinc with a warm solution of cupric chlorid and an alkali metal chlorid, of such composition as to leave the greater part of the zinc undissolved, thereby converting the lead sulfid into chlorid and cupric into cuprous chlorid, recovering the lead chlorid by refrigeration, oxidizing the cuprous into cupric chlorid and returning the latter into the cycle of operations, substantially as set forth.

7. A method of separating lead and silver from zinc, in complex sulfid ores containing lead, silver and zinc, which consists in treating the material with a warm cupric-chlorid solution of such composition as not to dissolve the zinc, whereby the lead silver sulfids are converted into chlorids, and the cupric is converted into cuprous chlorid, and recovering the lead chlorid by refrigeration, substantially as set forth.

In testimony that I claim the foregoing as my invention I have signed my name in presence of two subscribing witnesses.

CARL HOEPFNER.

Witnesses:
HENRY ORTH, Jr.,
HENRY ORTH.